(12) United States Patent
Kollman et al.

(10) Patent No.: US 7,752,724 B2
(45) Date of Patent: Jul. 13, 2010

(54) METHOD OF CUTTING BLINDS

(75) Inventors: Michael Kollman, Madison, WI (US); Adam Ward, Portland, OR (US)

(73) Assignee: Lumino, Inc., Madison, WI (US)

( * ) Notice: Subject to any disclaimer, the term of this patent is extended or adjusted under 35 U.S.C. 154(b) by 648 days.

(21) Appl. No.: 11/650,654

(22) Filed: Jan. 8, 2007

(65) Prior Publication Data
US 2007/0295176 A1 Dec. 27, 2007

Related U.S. Application Data

(63) Continuation-in-part of application No. 11/475,415, filed on Jun. 27, 2006.

(51) Int. Cl.
*B23P 19/04* (2006.01)
(52) U.S. Cl. .............. 29/24.5; 29/412; 29/423; 29/463; 29/560; 83/197; 83/198; 83/167; 83/20; 83/200; 83/267; 83/452; 83/618; 83/626
(58) Field of Classification Search ............ 29/24.5, 29/560, 423, 412, 463; 83/197, 198, 200, 83/167, 267, 452, 618, 20, 626
See application file for complete search history.

(56) References Cited

U.S. PATENT DOCUMENTS

| | | | |
|---|---|---|---|
| 4,993,131 A | 2/1991 | Graves et al. | |
| 5,072,494 A | 12/1991 | Graves et al. | |
| 5,103,702 A | 4/1992 | Yannazzone | |
| 5,339,716 A | 8/1994 | Sands et al. | |
| 5,375,307 A | 12/1994 | Rossiter | |
| 5,456,149 A | 10/1995 | Elsenheimer et al. | |
| 5,799,557 A | 9/1998 | Wang | |
| 5,806,394 A | 9/1998 | Marocco | |
| 5,816,126 A * | 10/1998 | Pluber | 83/167 |
| 5,927,172 A | 7/1999 | Wang | |
| 6,079,306 A | 6/2000 | Liu | |
| 6,089,134 A | 7/2000 | Marocco | |
| 6,178,857 B1 | 1/2001 | Marocco | |
| 6,169,099 B1 | 3/2001 | Marocco | |
| 6,334,379 B1 | 1/2002 | Sundano | |
| 6,336,388 B1 | 1/2002 | Marocco | |
| 6,412,381 B1 | 7/2002 | Wang et al. | |
| 6,427,571 B1 | 8/2002 | Hsu | |
| 6,435,066 B1 | 8/2002 | Kutchmarek et al. | |
| 6,604,443 B2 | 8/2003 | Roberts et al. | |
| 6,615,698 B2 | 9/2003 | Chuang et al. | |
| 6,681,673 B1 * | 1/2004 | Kutchmarek et al. | 83/468 |
| 6,688,204 B2 | 2/2004 | Huang | |
| 6,761,099 B2 | 7/2004 | Lin et al. | |
| 6,793,073 B2 * | 9/2004 | Tu | 206/320 |
| 6,945,152 B2 | 9/2005 | Jabbari et al. | |
| 6,971,296 B2 | 12/2005 | Lin et al. | |
| 7,000,516 B2 | 2/2006 | Lin et al. | |
| 7,007,576 B2 | 3/2006 | Roberts et al. | |
| 2003/0066403 A1 | 4/2003 | Lin et al. | |
| 2005/0188515 A1 * | 9/2005 | Reimer et al. | 29/24.5 |

* cited by examiner

*Primary Examiner*—David P Bryant
*Assistant Examiner*—Bayan Salone
(74) *Attorney, Agent, or Firm*—Buchanan Ingersoll & Rooney PC

(57) ABSTRACT

A method of trimming blinds is disclosed in which at least one spacer is attached to a blind to space the headrail, bottomrail, and window covering between the headrail and bottomrail in relative positions that correspond to openings in a cutting device. A portion of the blind that is desired to be cut is then moved into those openings and cut away.

14 Claims, 4 Drawing Sheets

METHOD OF CUTTING BLINDS

CROSS REFERENCE TO RELATED APPLICATION

This is a continuation-in-part patent application of U.S. patent application Ser. No. 11/475,415, filed on Jun. 27, 2006, now pending.

FIELD OF INVENTION

The invention relates to method of cutting blinds to fit an opening whose dimensions are provided by a customer.

BACKGROUND OF THE INVENTION

Many home centers and other retailers of window covering products purchase venetian blinds in stock sizes from a blind manufacturer and display those blinds in retail store locations. These retailers have machines, which are often referred to as cut-down machines, that a salesperson or technician can use to trim a stock blind to fit a window, door or other opening having dimensions smaller than the dimensions of a stock blind. Typically, the customer provides these dimensions. For example, a customer may tell a salesperson that the dimensions of the window to be covered by the blind are 34 inches wide and 48 inches tall. The stock blind closest to those dimensions is 36 inches wide and 48 inches in length. Consequently, it will be necessary to cut two inches from the width of the stock blind to create a blind that will fit the customer's window. Because the customer usually wants each of the two ladders in a venetian blind of this size to be the same distance from the edge of the blind nearest the ladder, the retailer will cut away an equal amount of material from each edge of the blind rather than cut all the material from one edge of the blind. In the example, one inch would be cut from each edge of the blind. If the blind is too long for the opening, extra slats or other window covering material can be removed from the bottom of the blind. A cut-down machine is not used for this purpose.

There are several types of blind trimming machines known in the art. One type of blind trimming or cut-down machine has a set of cutting dies that act as the cutting mechanism for trimming a venetian type blind. The operator of these machines must insert the headrail into one die cavity, insert the bottomrail into another die cavity and insert the slats into a third die cavity. Examples of this type of machine can be found in U.S. Pat. Nos. 5,799,557 and 5,927,172 to Wang, 5,806,394 and 6,196,099 to Marocco and 6,761,099 to Lin et al. In each of these machines the die cavities are in fixed locations relative to one another. Typically, an operator of the machine will remove the blind to be cut from its container and place the blind on a table adjacent the cutting dies. Then the operator will maneuver the headrail, slats and bottomrail until they are positioned within the appropriate die cavities. The machine may have an alignment guide to assist the operator in positioning the blind. In U.S. Pat. No. 5,927,172 Wang discloses an end stop having three recesses, which is positioned opposite the cutting die. The operator positions the headrail, slats and bottomrail within the appropriate recesses prior to cutting.

An operator can spend several minutes removing a venetian blind from its box and positioning the blind on the cut-down machine so that the headrail, slats and bottomrail are aligned with the appropriate die cavities. Consequently, the art has proposed boxes with removable end caps that can be used for venetian blinds such that the blind can be trimmed without fully removing the blind from the box. One example of such a container is disclosed in U.S. Pat. No. 6,793,073 to Tu. Since the headrail and bottomrail of the venetian blind are free to move relative to one another when partially within a container such as that described by Tu, an operator of a cut-down machine must still adjust the relative positions of the headrail, slats and bottomrail to align them with there respective die cavities in the cut-down machine.

Consequently, there is a need for a method of trimming blinds that permits an operator to cut a blind without independently moving the headrail, window covering, and bottomrail into relative positions that correspond to the die cavities in cutting machines. Such a method would permit an operator to cut a blind much quicker than if the operator followed the standard practice of independently aligning the headrail, slats and bottomrail into their respective die cavities.

SUMMARY OF THE INVENTION

We provide a method for cutting blinds in which at least one spacer is attached to a blind to space the headrail, bottomrail, and window covering between the headrail and bottomrail to relative positions that correspond to openings in a cutting device. A portion of the blind that is desired to be cut is then easily moved into or through these openings and that portion is then cut away.

We prefer to provide a spacer that is in the form of a collar that fits around the blind. The collar has a generally rectangular first ring or half ring that fits over the headrail of a blind and a generally rectangular second ring or half ring that fits over the bottomrail of the blind. A pair of spaced apart side walls extend between the two rings and create a cavity sized to receive the window covering portion of the blind. However, if half rings are provided, only a single side wall is provided to define such a cavity. The sidewall or sidewalls keep the first ring and second ring in a selected spaced apart relationship that corresponds to the spacing between the headrail, window covering and bottomrail openings in the cutting device. Thus, once at least one collar is attached to the blind that blind can be readily inserted into the openings in the cutting device and, subsequently, cut.

The blind may be placed into a package after at least one collar is placed on the blind. Thereafter, only the end of the blind need be removed from the package to position the blind in the openings in the cutting device.

Because headrails of blinds are often wider than the window covering or bottomrail portions of the blinds, the cavity defined by the sidewall or sidewalls will be narrower than the opening defined by the first ring or half ring. We prefer to provide at least one flange on the outer surface of the collar to prevent the blind from moving while in the package. The flanges are sized so that a plane tangent to the distal ends of the flanges on one sidewall will be tangent to the side of the first ring. Consequently, when a venetian blind bearing a collar at each end is placed in a box having a width slightly larger than the width of the first ring, the flanges will prevent side to side movement of the blind within the box until the blind is removed.

The present method can be used to cut venetian blinds, cellular shades, and other window coverings having a headrail. When cutting blinds having cellular material, we prefer to clamp the cellular material with a clamping mechanism.

Other objects, advantages and aspects of the invention will become apparent as the description of certain present preferred embodiments thereof illustrated in the drawings proceeds.

DESCRIPTION OF THE PREFERRED EMBODIMENTS

Figure 3:
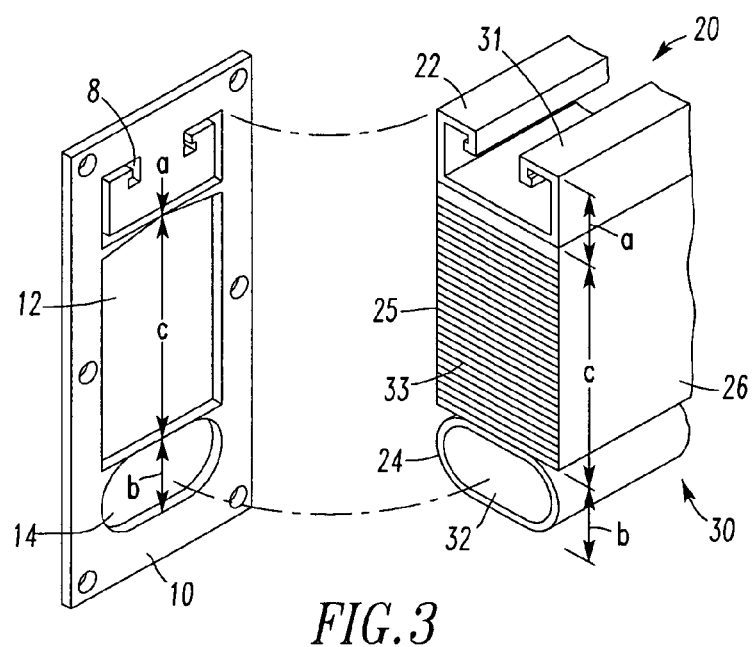
FIG. 3 is a side-by-side comparison view of a front view of openings on the cutting device and an end view of the blind with collar shown in FIG. 2.
Figure 2:
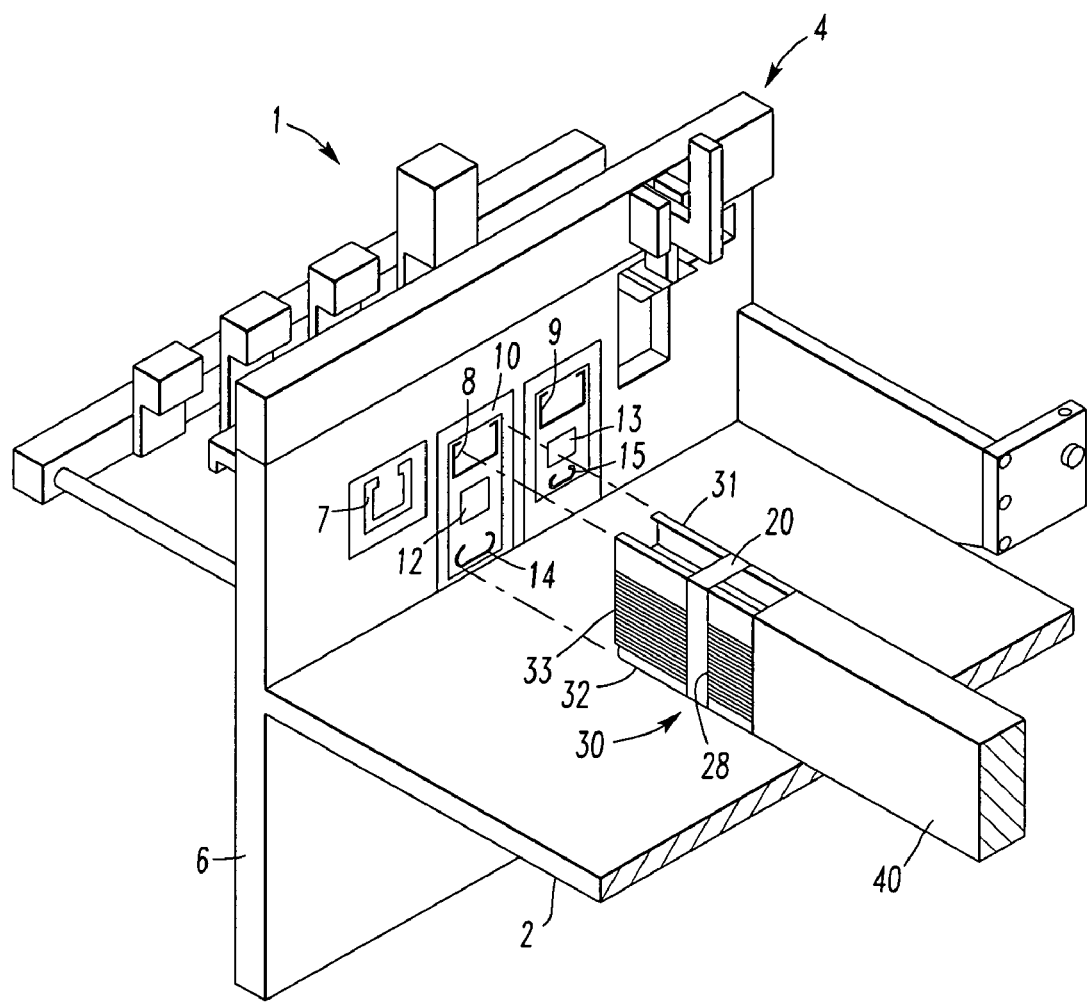
FIG. 2 is a perspective view of a portion of the blind to be cut positioned on the cutting device of FIG. 1.
Figure 4:
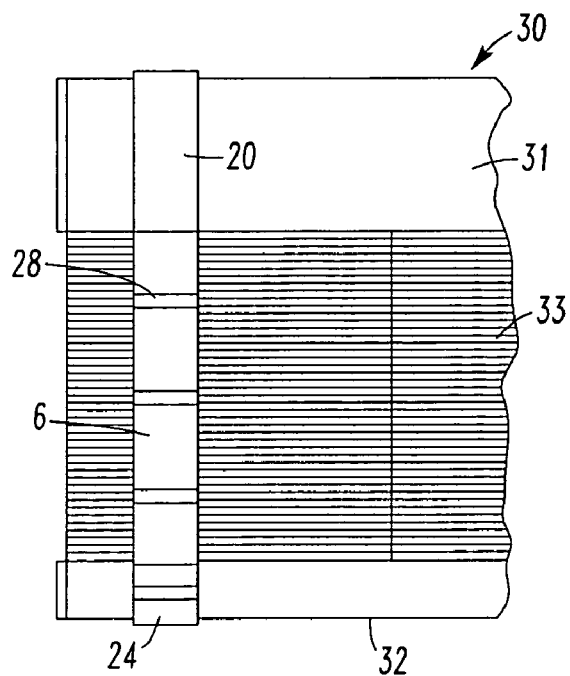
FIG. 4 is a front view of a portion of a blind with a spacer attached to the blind for use in our method of cutting a blind.

Referring to FIGS. 2, 3 and 4, blind 30 is a horizontal blind that has a headrail 31, a bottomrail 32 and window covering material 33 between the headrail and the bottomrail. It should be noted that the window covering material 33 is the material used to cover an opening when the blind is at least partially lowered. Thus, as used in this specification, "window covering" material encompasses a set of slats, such as those commonly found in venetian or vertical blinds, cellular material, pleated material, or other window covering material that is hung from a headrail to cover an opening. The term "blind," as used in this specification, refers to devices used to hinder vision or shut out light, such as window shades or venetian blinds, that have window covering material hang from a headrail to cover an opening. Thus, the term "blind" includes, but is not limited to vertical blinds, venetian blinds, cellular shades and pleated shades.

Figure 1:
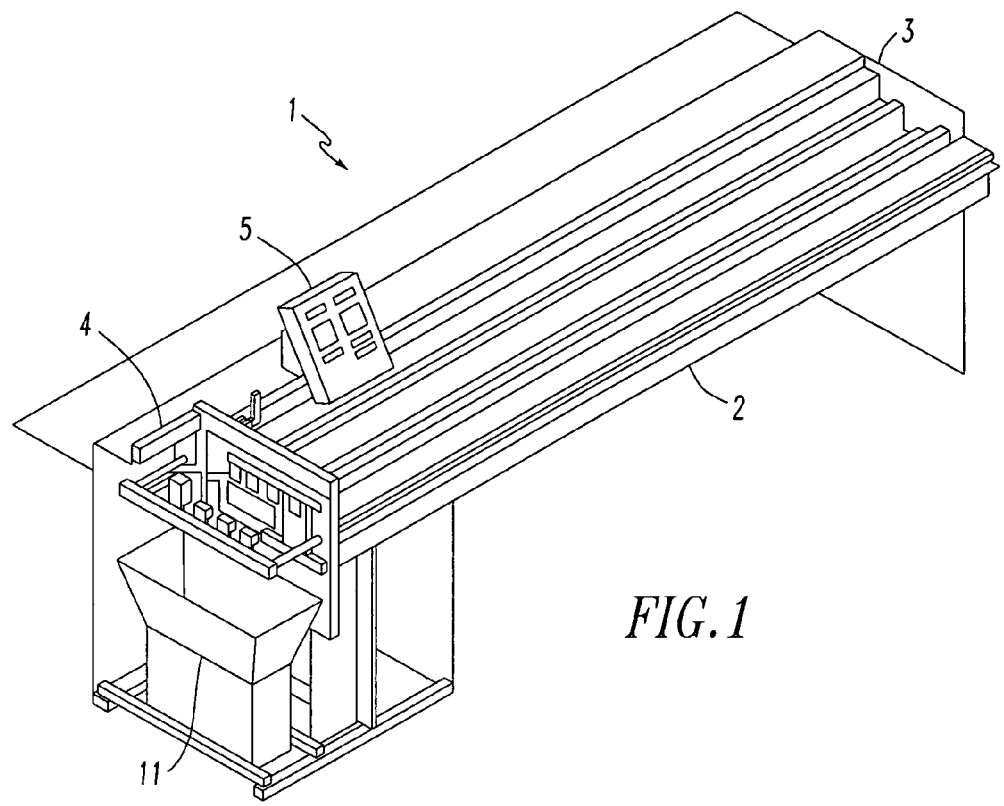
FIG. 1 is a perspective view of a cutting device that can be used in our method of cutting a blind.

Referring to FIG. 1, a cutting device 1 has a blind support table 2 and a blind cutting mechanism 4. A refuse container 11 is provided under the cutting mechanism. A control pad 5 is positioned on the support table 2. There are three tracks 3 on the table which are aligned with one of three cutting locations in a support housing in the blind cutting mechanism 4. As can be seen most clearly in FIG. 2, each cutting location corresponds to a headrail opening 7, 8 or 9. Each of the headrail openings preferably are formed in a die 10 which is held in the support housing 6. Each headrail opening is configured to receive a headrail. That is, each opening corresponds to a cross section through the headrail. The opening may be tapered to permit easy insertion of the headrail into the opening. Below headrail openings 8 and 9 there is a window covering material opening 12, 13 and a bottomrail opening 14, 15. As shown in FIG. 2, one blind cutting location only has a headrail opening 7 and is used to cut only a headrail. That opening would not be used in our method. The second and third cutting locations each have separate openings for the headrail, for the bottomrail and for the window covering material. These two locations differ in that the window material covering opening 12 in the middle cutting location is longer so as to accommodate a longer blind. At each of the second and third cutting locations the headrail opening, window material covering opening and bottomrail opening are aligned along a vertical axis.

The headrail opening 8, window covering material opening 12 and bottomrail opening 14 in the cutting mechanism 4 are spaced apart known distances a, b and c, as indicated in FIG. 3. At least one spacer is attached to the blind 30 so that the headrail, window covering material and bottomrail in the blind have the same spacing. As a result, a sales associate can cut the blind 30 without independently adjusting the bottomrail 32, headrail 31, or window covering material 33 portions of the blind 30 before placing them in their respective openings in a cut down machine.

Figure 5:
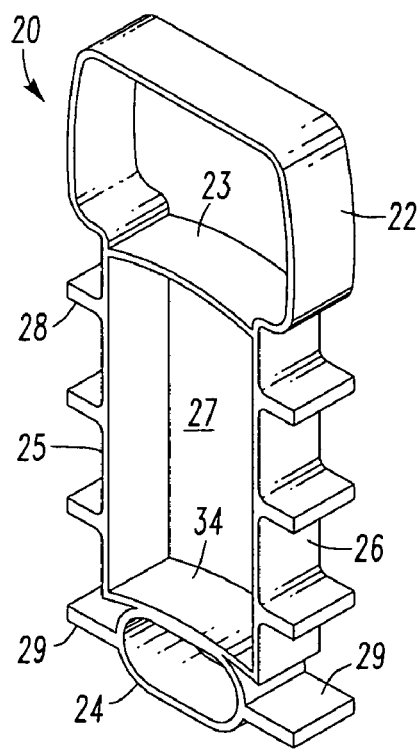
FIG. 5 is a perspective view of a first present preferred spacer that can be used in our method.
Figure 6:
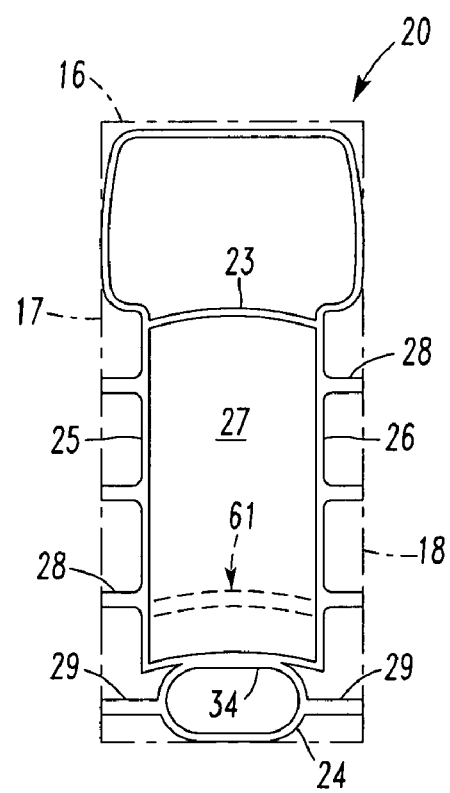
FIG. 6 is a front view of the spacer shown in FIG. 5.

Referring to FIGS. 5 and 6, a first present preferred spacer that can be used in our method is a collar 20 that has a generally rectangular first ring 22 and a generally rectangular second ring 24 separated by a pair of spaced apart sidewalls 25, 26. The first ring 22 is sized to fit over a headrail 31 of a blind 30 as shown in FIGS. 2 and 3. The second ring 24 is sized to fit over the bottomrail 32. The sidewalls 25, 26 define a cavity 27 into which the window covering material 33 fits and maintains the first ring and second ring a selected distance apart. That distance corresponds to the spacing between the headrail die cavity 8 and bottomrail die cavity 14 in the cutting device 1. Consequently, the collar 20 attached to an end of a blind, as shown in FIG. 3, spaces the blind portions 31, 32, 33 such that the blind can be readily inserted into the die 10 of the cutting device 1. Moreover, such insertion can be made without fully removing the blind from the box 40 in which it is packaged, as indicated in FIG. 2.

Preferably, spacers are placed on the blind 30 before they are placed into a package 40 and delivered to a retailer. When such a packaged blind is subsequently desired to be cut or trimmed, one end of the package containing the blind to be cut is opened and the blind is partially removed from the box. The blind to be cut could be in a telescoping box of the type disclosed in published United States Patent Application 2006/0108078. The blind to be cut is placed in one of the three tracks 3. The blind and box are positioned relative to one another so that one end of the blind extends out of the box while the opposite end is within the box, as shown in FIG. 2. At least a part of the end of the blind that extends from the box is inserted through the openings 8, 12, 14 as indicated in FIG. 2. Because the relative spacing of the headrail, window covering material, and bottomrail are the same as the relative spacing of the headrail opening, window covering material opening and bottomrail opening, a sales associate can readily insert this portion of the blind into the cutting device and trim the blind.

We further prefer to place a collar 20 that has a series of flanges 28 extending from the sidewalls and a pair of flanges 29 extending from the second ring on a blind. The flanges are sized such that when a blind is placed in a box 40 of a selected size, the distal ends of the flanges and the sides of the first ring will abut the sides of the box. Stated another way, a plane passing over the distal ends of one set of flanges 17 and a plane passing over the distal ends of a second set of flanges 18 will be generally parallel and a selected distance apart. Preferably, that distance will correspond to the width of the first ring 16.

The slats in aluminum and vinyl venetian blinds are curved across their width. Consequently, we prefer that the bottom 23 of the first ring 22 and the top of 34 of the second ring 24 be similarly curved for collars of such blinds.

Other embodiments of collar 20 can be placed on a blind to space the blind portions 31, 32, 33 by cutting collar 20 through a plane that is parallel to planes 17 and 18 in FIG. 6. The resulting collar would be similar to the collar 50 shown in FIG. 7. Collar 50 has a first half ring 51 having a bottom 55 that is sized to fit over the headrail of a blind and a second half ring 52 having a top 56 that is sized to fit over the bottomrail of a blind. The half rings 51 and 52 are connected to opposite ends of a sidewall 53. The sidewall is sized to keep the half rings and the headrail and bottomrail a selected distance apart. That selected distance corresponds to the distance between the cavities in the cutting side of a cutting machine that receives the headrail and bottomrail. As in the previous embodiments, flanges 58 and 59 may extend from the sidewall 53 and second half ring 52. The portions 54, 55 of the split rings that extend above or below the headrail should have a length that is greater than half the width of the headrail so that the collar is not easily dislodged from the headrail. However, any length could be used. Similarly, the portions 56, 57 of the second half ring that extend above and below the bottomrail should have a length that is greater than half the width of the bottom rail. As with portions 54 and 55, however, smaller lengths could be used. Sidewall 53, the bottom 55 of the first half ring 51 and the top 56 of the second half ring 52 define a cavity 60 that will receive the window covering portion 33 of a blind 30. A front view of blind 30 with collar 50 attached is shown in FIG. 4.

Figure 7:
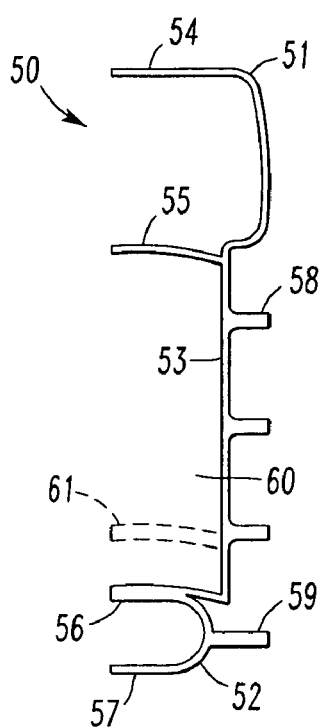
FIG. 7 is a front view of a second present preferred spacer that can be used in our method.

If desired, a partition 61, which is illustrated by a dotted line in FIGS. 6 and 7, may be provided on collars 20 or 50 to appropriately space the window covering from the bottomrail or headrail to a desired position. Such partitions may or may not be removable.

Figure 8:
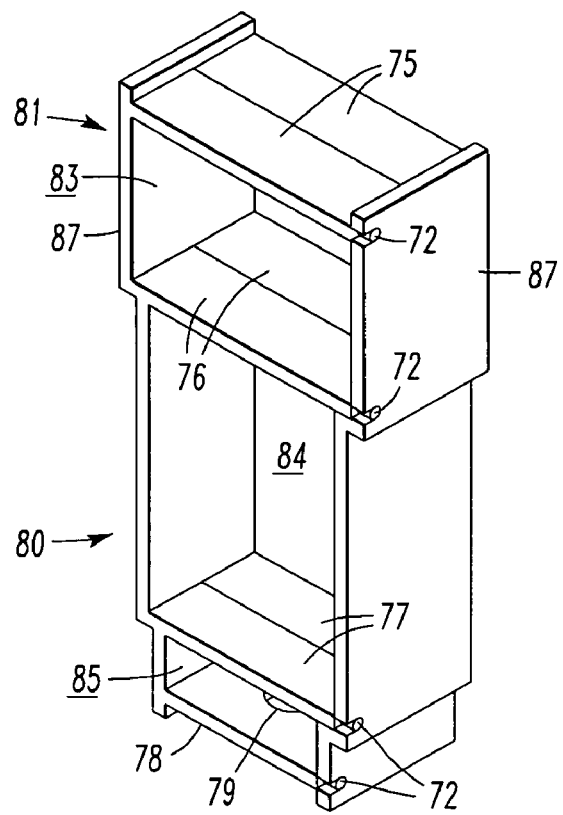
FIG. 8 is a perspective view of a third present preferred spacer that can be used in our method.
Figure 9:
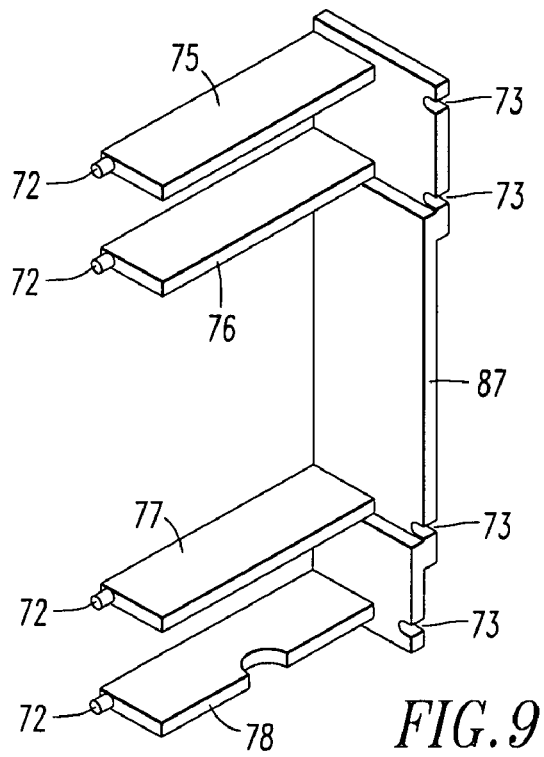
FIG. 9 is a perspective view of an interlockable part that can be used to make the third present preferred spacer.

A third present preferred spacer that can be used in our method is illustrated in FIG. 8. The third present preferred spacer 80 can be formed by interlocking two parts of identical or near identical shape 81 to form collar 80. Each part 81 has arms 75, 76, 77, 78 that extend form sidewall 87. Each arm and has a projection 72 at an end opposite the sidewall 87, which may be best seen in FIG. 9. Sidewall 87 has openings 73 spaced and sized to receive projections attached to corresponding arms of the other part. Collar 80 is formed when the two parts 81 are interlocked by snapping projections 72 into corresponding holes 73 as shown in FIG. 8.

We prefer to have projections attached to each arm. It should be noted, however, that parts 81 can interlock and form a functional collar 80 when only some of the arms have such projections.

When the parts 81 are interlocked, arms 78 and 77 and sidewalls 87 form cavity 85, which is sized to retain a bottomrail, arms 76 and 77 and sidewalls 87 define cavity 84, which is sized to retain window covering material, and arms 75 and 76 and sidewalls 87 define cavity 83, which is sized to retain a headrail. Arms 75, 76, 77, 78 are spaced so that the headrail, window covering material and bottomrail cavities 83, 84, 85 can retain the headrail, window covering material and bottomrail portions of the blind 30 in positions that correspond with headrail opening 8, window covering material opening 12, and bottomrail opening 14 of cutting device 1.

The arms can be configured such that interlocked parts 81 have corresponding arms that are spaced apart or arms that define apertures. For example, corresponding arms 78 can be configured to form aperture 79 when parts 81 are interlocked, as shown in FIG. 8. As another example, corresponding arms 76 of each interlocked part 81 can be configured so that a gap (not shown) is formed between the corresponding arms 76 when parts 81 are interlocked to form collar 80. Such gaps or apertures can permit cords that run through the headrail, window covering material, and bottomrail portions of the collared blind to pass through the collar. Apertures and gaps may also permit the collar to be made with less material, making the collar less expensive.

We prefer to use a collar made from plastic material, such as polyvinyl chloride. However, collars made of cardboard or other materials, such as wire, could be used.

It should be understood that the spacers used in our method could be clips, wedges, cardboard, polystyrene pieces, Bubble Wrap® material, rubber bands, or other devices capable of spacing headrail 31, bottomrail 32, and window covering material 33 portions of the blind 30 to the corresponding positions of the openings 8, 12, and 14 in the cutting device 1. Importantly, the spacers attached to the blind 30 must also be able to retain this desired spacing until the portions of the blind 30 that are desired to be cut away have been cut away.

The spacers are attached to the blind to retain the headrail, window covering material, and bottomrail in positions that correspond with openings 8, 12, 14 in a cutting device 1. As a result, the blind is capable of being readily trimmed. Once the spacer is attached, the blind is placed on the appropriate track 3. Once on the track, a portion of the blind is moved through openings 8, 12, 14. This portion is then cut. Because the operator does not have to spend any time independently adjusting each blind portion to fit within its respective opening, the blind is trimmed in much less time than if the operator were to follow the standard method of trimming blinds.

As indicated above, our method can be used to cut most of the window covering products that have a headrail. For example, this method can be used to trim or cut venetian blinds having plastic or metal slats, vertical blind slats, pleated shades and cellular shades.

In the event that cellular shades or pleated shades are trimmed, we prefer to provide a clamping mechanism to clamp the cellular or pleated material prior to cutting this material.

In the cutting device illustrated in the drawings each set of openings for the headrail, bottomrail and window covering material are on a vertical axis. However, the openings could be on a horizontal axis.

Although we have described and illustrated certain present preferred embodiments of our invention and have illustrated certain present preferred methods of practicing the same, it should be distinctly understood that our invention is not limited thereto but may be variously embodied within the scope of the following claims.

We claim:

1. A method of cutting a blind comprising:
   providing a blind of the type having a headrail, a bottomrail and window covering material between the headrail and the bottomrail;
   providing a cutting device having at least three spaced openings, a first opening sized to receive the headrail, a second opening sized to receive the window covering material, and a third opening sized to receive the bottomrail, the openings having a known relative spacing from one another, and being on a common axis;
   attaching at least one collar to the blind, the at least one collar spacing the headrail, window covering material and bottomrail at a relative spacing from one another that corresponds to the relative spacing of the first opening, second opening, and third opening in the cutting device;
   moving a portion of the blind into the spaced openings in the cutting device, a portion of the headrail being moved into the first opening, a portion of the window covering material being moved into the second opening, and a portion of the bottomrail being moved into the third opening; and
   cutting the portion of the blind; and the at least one collar being comprised of:
- a generally rectangular first ring sized to receive the headrail, the first ring having a bottom and a first selected width;
- a generally rectangular second ring sized to receive the bottomrail, the second ring having a top and a second selected width; and
- a pair of spaced apart side walls extending from the bottom of the first ring to the top of the second ring, the sidewalls, bottom of the first ring, and top of the second ring, defining a cavity sized to receive the window covering material.

2. The method of claim 1 wherein the window covering material is selected from the group consisting of a plurality of slats, pleated material and cellular material.

3. The method of claim 1 wherein the at least one collar is further comprised of at least one partition within the cavity sized to receive the window covering.

4. The method of claim 1, wherein the at least one collar is further comprised of a material selected from the group consisting of plastics, polyvinyl chloride, cardboard, and metal.

5. The method of claim 1 wherein the blind is partially within a box while a portion of the blind is being moved into the spaced opening.

6. The method of claim 1 the method further comprising putting the blind in a package.

7. The method of claim 6, wherein the blind is put in the package after the at least one collar is attached to the blind.

8. A method of cutting a blind comprising:
- providing a blind of the type having a headrail, a bottomrail and window covering material between the headrail and the bottomrail;
- providing a cutting device having at least three spaced openings, a first opening sized to receive the headrail, a second opening sized to receive the window covering material, and a third opening sized to receive the bottomrail, the openings having a known relative spacing from one another, and being on a common axis;
- attaching at least one collar to the blind, the at least one collar spacing the headrail, window covering material and bottomrail at a relative spacing from one another that corresponds to the relative spacing of the first opening, second opening, and third opening in the cutting device;
- moving a portion of the blind into the spaced openings in the cutting device, a portion of the headrail being moved into the first opening, a portion of the window covering material being moved into the second opening, and a portion of the bottomrail being moved into the third opening; and
- cutting the portion of the blind; and
  - the at least one collar comprised of:
    - a first half ring sized to receive the headrail, the first half ring having a bottom,
    - a second half ring sized to receive the bottomrail, the second half ring having a top; and
    - a side wall extending from the bottom of the first half ring to the top of the second half ring, the sidewall, bottom of the first half ring, and top of the second half ring defining a cavity sized to receive the window covering; and
  - at least one partition within the cavity sized to receive the window covering material, the at least one partition being removable.

9. The method of claim 8 wherein the at least one collar is further comprised of a material selected from the group consisting of plastics, cardboard, polyvinyl chloride, and metal.

10. The method of claim 1 the method further comprising clamping the window covering material.

11. The method of claim 8 further comprising clamping the window covering material.

12. The method of claim 8 further comprising putting the blind in a package.

13. The method of claim 12, wherein the blind is put in the package after the at least one collar is attached to the blind.

14. The method of claim 8 wherein the window covering material is selected from the group consisting of a plurality of slats, pleated material and cellular material.

* * * * *